United States Patent
Kato et al.

(10) Patent No.: US 9,100,524 B2
(45) Date of Patent: Aug. 4, 2015

(54) IMAGE SENSOR UNIT, IMAGE READING APPARATUS, AND IMAGE FORMING APPARATUS

(71) Applicant: CANON COMPONENTS, INC., Kodama-gun, Saitama (JP)

(72) Inventors: Junichi Kato, Saitama (JP); Takashi Chiba, Saitama (JP); Junya Kinoshita, Saitama (JP)

(73) Assignee: CANON COMPONENTS, INC. (JP)

( * ) Notice: Subject to any disclaimer, the term of this patent is extended or adjusted under 35 U.S.C. 154(b) by 0 days.

(21) Appl. No.: 14/283,309

(22) Filed: May 21, 2014

(65) Prior Publication Data

US 2014/0376061 A1    Dec. 25, 2014

(30) Foreign Application Priority Data

Jun. 19, 2013  (JP) ................................. 2013-128739

(51) Int. Cl.
- *H04N 1/04* (2006.01)
- *H04N 1/00* (2006.01)
- *H04N 1/192* (2006.01)
- *H04N 1/193* (2006.01)

(52) U.S. Cl.
CPC ........... *H04N 1/00798* (2013.01); *H04N 1/192* (2013.01); *H04N 1/1931* (2013.01); *H04N 1/1934* (2013.01); *H04N 1/1935* (2013.01); *H04N 1/1938* (2013.01)

(58) Field of Classification Search
CPC . H04N 1/00798; H04N 1/192; H04N 1/1931; H04N 1/1934; H04N 1/1935; H04N 1/1938
USPC .......................... 358/474, 498, 497, 496, 484
See application file for complete search history.

(56) References Cited

U.S. PATENT DOCUMENTS

| | | | |
|---|---|---|---|
| 5,594,260 A | 1/1997 | Tsutsui et al. | |
| 2010/0213355 A1* | 8/2010 | Wang et al. | 250/216 |

FOREIGN PATENT DOCUMENTS

| | | |
|---|---|---|
| EP | 0751568 A2 | 1/1997 |
| EP | 1650949 A1 | 4/2006 |
| EP | 2608518 A2 | 6/2013 |
| EP | 2608519 A2 | 6/2013 |
| JP | 0786541 A | 3/1995 |

OTHER PUBLICATIONS

European extended Search Report issued in European counterpart application No. EP141701672, dated Aug. 5, 2014.

\* cited by examiner

*Primary Examiner* — Houshang Safaipour
(74) *Attorney, Agent, or Firm* — Rossi, Kimms & McDowell LLP

(57) ABSTRACT

A plurality of edges of sensor substrates are connected in a longitudinal direction in a sensor substrate unit. Farthest tips of sensor chips at the edges of the sensor substrates are positioned inside of farthest edges of the edges in the longitudinal direction. The edges of the connected sensor substrates overlap each other in a thickness direction of the sensor substrates in plan view.

10 Claims, 12 Drawing Sheets

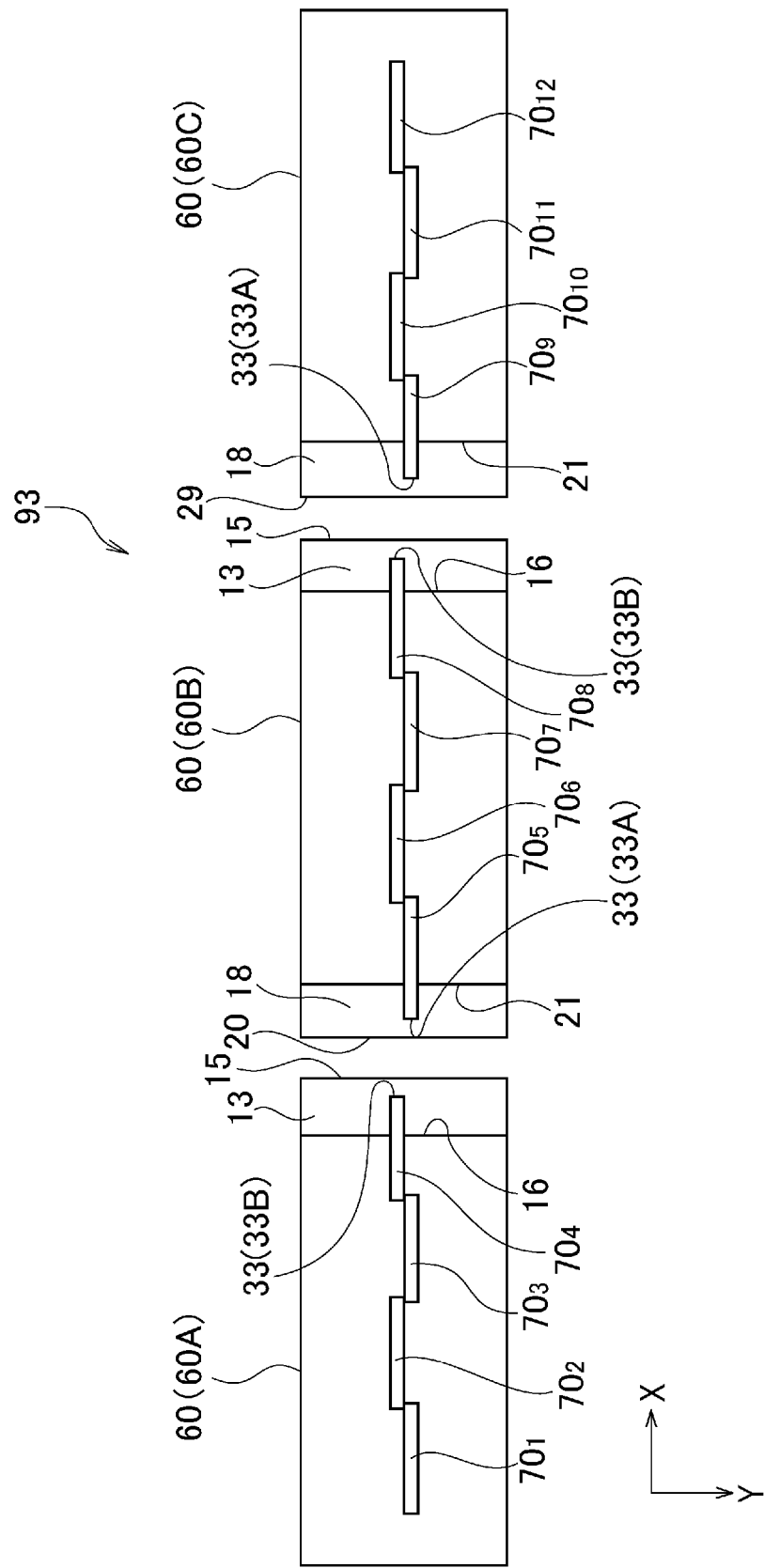

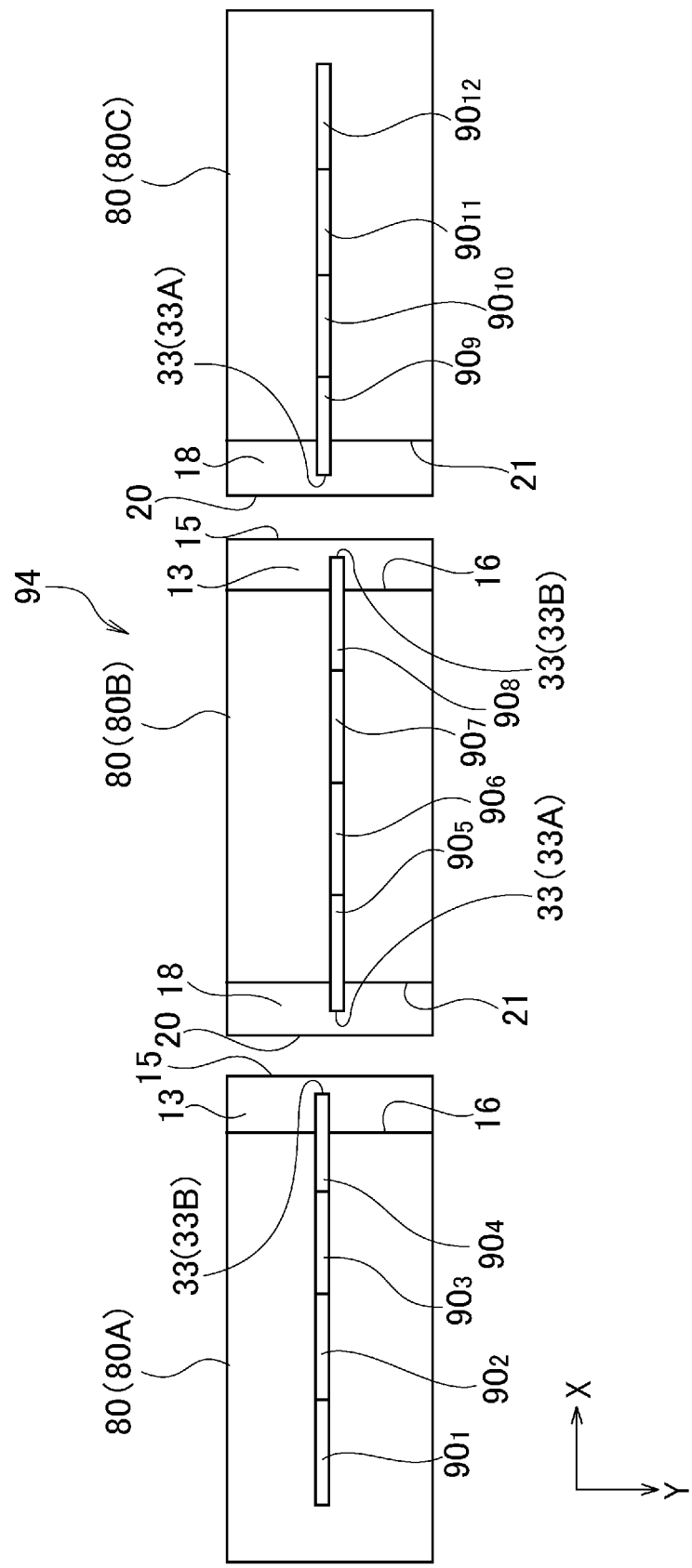

IMAGE SENSOR UNIT, IMAGE READING APPARATUS, AND IMAGE FORMING APPARATUS

CROSS-REFERENCE TO RELATED APPLICATIONS

This application is based upon and claims the benefit of priority of the prior Japanese Patent Application No. 2013-128739, filed on Jun. 19, 2013, the entire contents of which are incorporated herein by reference.

BACKGROUND OF THE INVENTION

1. Field of the Invention

The present invention relates to an image sensor unit, an image reading apparatus, and an image forming apparatus. Particularly, the present invention relates to an image sensor unit, an image reading apparatus, and an image forming apparatus that read large originals and the like.

2. Description of the Related Art

Readable lengths (hereinafter, "read lengths") of originals are generally about A4, B4, and A3 sizes in an image sensor unit used in an image reading apparatus, such as a facsimile and a scanner. In recent years, an elongated image sensor unit that can read large originals in A2, A1, and A0 sizes exceeding the read length of A3 size is used in an image reading apparatus, such as an electronic white board.

In the image sensor unit of the image reading apparatus that reads large originals and the like exceeding the A3 size, a plurality of sensor substrates shorter than the A3 size, on which a plurality of sensor chips are mounted, are arranged in series in a main-scan direction. In the serial arrangement of the sensor substrates, it is ideal to extremely reduce intervals between the sensor chips mounted on adjacent sensor substrates to reduce image missing sections in reading. However, high reading accuracy is not demanded in the image sensor unit used for an electronic white board or the like, and there is no problem even if the intervals between the sensor chips are large.

On the other hand, the same read quality as that of a general scanner is demanded in an image reading apparatus that needs fine reading of a large map and the like, and generation of an image missing section needs to be prevented. For example, Patent Document 1 discloses a photoelectric conversion apparatus elongated by connecting a plurality of wiring boards (sensor substrates) on which LED chips (sensor chips) are arranged.

Patent Document 1

Japanese Laid-Open Patent Publication No. 07-86541

However, the sensor chips protrude from ends of the sensor substrates in the photoelectric conversion apparatus disclosed in Patent Document 1. Therefore, the sensor chips may be damaged when, for example, the sensor substrates are connected or when the sensor substrates provided with the sensor chips are stored.

SUMMARY OF THE INVENTION

The present invention has been made in view of the foregoing problem, and an object of the present invention is to prevent damage to sensor chips.

The present invention provides an image sensor unit including: a light source that illuminates an object to be read; a sensor substrate unit connecting a plurality of sensor substrates including a plurality of sensor chips arranged and mounted in a line in a longitudinal direction; a light condenser that focuses light from the object to be read on the sensor substrate unit; and a supporting body that supports the light source, the sensor substrate unit, and the light condenser, wherein edges of the connected sensor substrates are brought into close contact with each other in the sensor substrate unit, farthest tips of the sensor chips at the edges are positioned inside of farthest edges of the edges in the longitudinal direction of the sensor substrates, and the edges of the connected sensor substrates overlap each other in a thickness direction of the sensor substrates in plan view.

BRIEF DESCRIPTION OF DRAWINGS

FIG. 11 is a plan view of a sensor substrate unit 93 according to another embodiment; and FIG. 12 is a plan view of a sensor substrate unit 94 according to another embodiment.

DETAILED DESCRIPTION OF THE PREFERRED EMBODIMENTS

Figure 1:
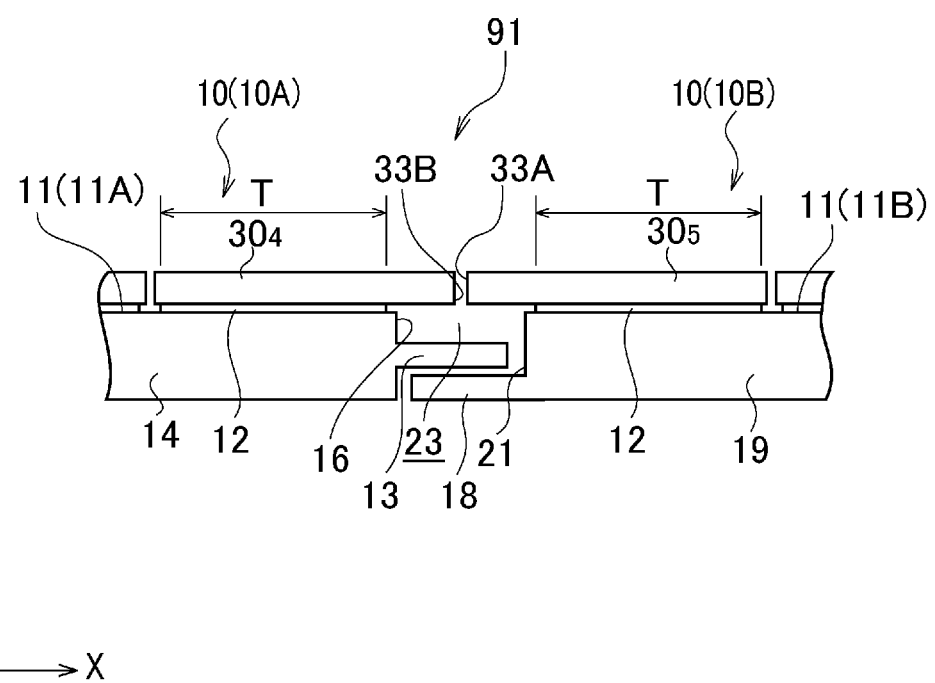
FIG. 1 is a diagram illustrating a state that sensor substrates 10A and 10B are brought into close contact according to the present embodiments.

Embodiments that can apply the present invention will now be described in detail with reference to the drawings.

In the present embodiments, an image sensor unit described later as well as an image reading apparatus and an image forming apparatus to which the image sensor unit is applied will be described. In the drawings described below, a main-scan direction of the image sensor unit is indicated by an X direction, a sub-scan direction is indicated by a Y direction, and a direction orthogonal to the main-scan direction and the sub-scan direction is indicated by a Z direction, as necessary. In the image reading apparatus and the image forming apparatus, the image sensor unit emits light to an original D as an object to be read, and reflected light is converted to an electric signal to read an image (reflection reading). The object to be read is not limited to the original D, and other objects to be read can also be applied. Transmission reading can also be applied.

Figure 2:
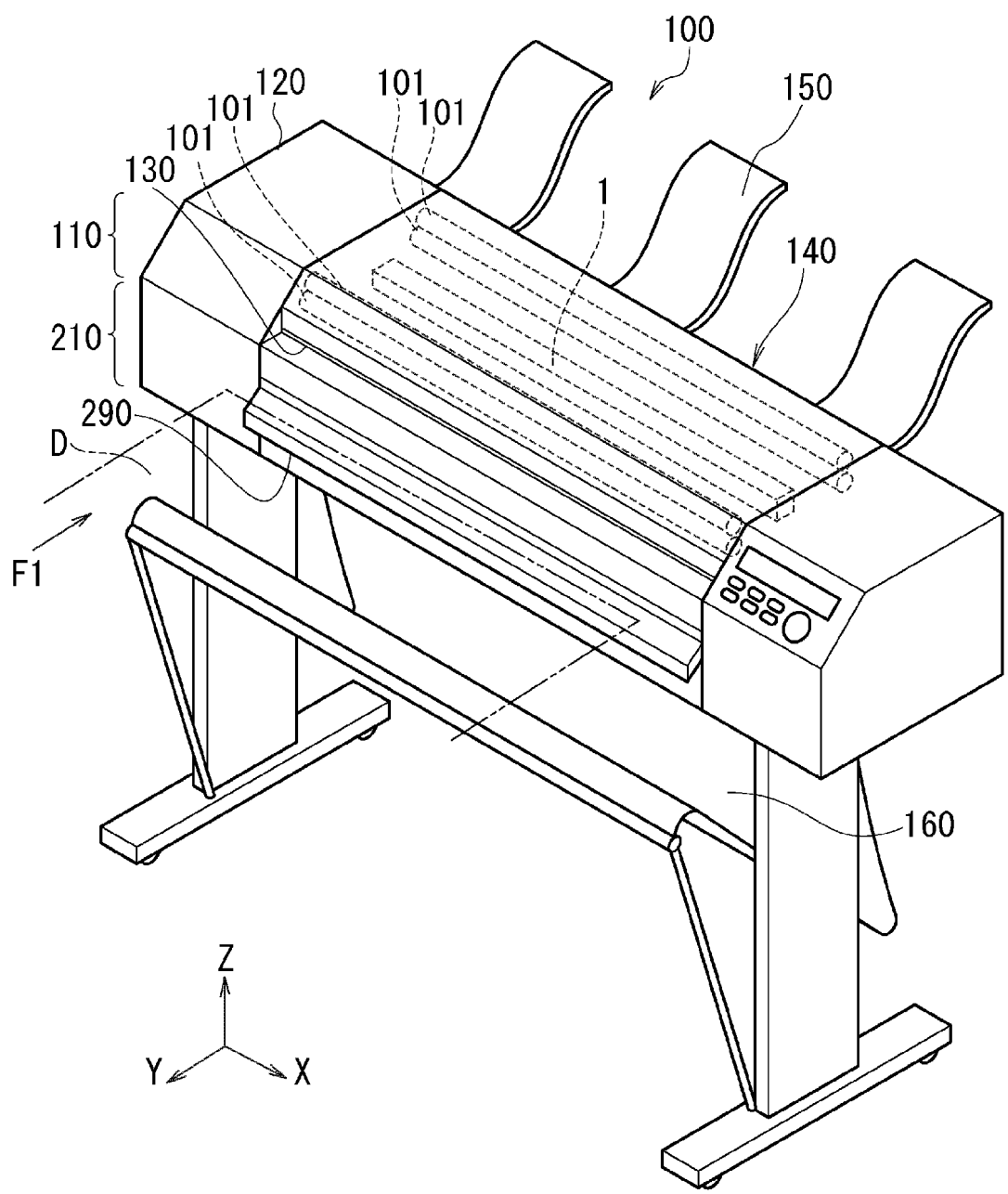
FIG. 2 is a perspective view illustrating an appearance of an MFP 100 including an image sensor unit 1 according to the present embodiments.

A structure of a multi-function printer (MFP) as an example of an image reading apparatus or an image forming apparatus will be described with reference to FIG. 2. FIG. 2 is a perspective view illustrating an appearance of an MFP 100 that can handle a large original. As shown in FIG. 2, the MFP 100 includes: an image reading portion 110 as image reading means that is a sheet-feed type image scanner and that reads reflected light from a large original D in an A0 size, A1 size, or the like; and an image forming portion 210 as image forming means that forms (prints) an image of the original D on a roll sheet R (recording paper) as a recording medium.

The image reading portion 110 has a function of a so-called image scanner and is configured, for example, as follows. The image reading portion 110 includes: a housing 120; a paper feeding opening 130; an original discharge opening 140; an original recovery unit 150; an image sensor unit 1; and original conveyor rollers 101.

The image sensor unit 1 is, for example, a contact image sensor (CIS) unit. The image sensor unit 1 is fixed in the housing 120.

In the image reading portion 110, the original D inserted from the paper feeding opening 130 to the housing 120 is placed between the original conveyor rollers 101 rotated and driven by a driving mechanism and conveyed relative to the image sensor unit 1 at a predetermined conveyance speed. The image sensor unit 1 optically reads the conveyed original D, and a sensor chip 30 described later converts the original D to an electric signal to perform a reading operation of an image. The original D subjected to image reading is conveyed by the original conveyor rollers 101 and discharged from the original discharge opening 140. An original recovery unit 150 disposed rear surface of the housing 120 recovers the original D discharged from the original discharge opening 140.

Figure 3:
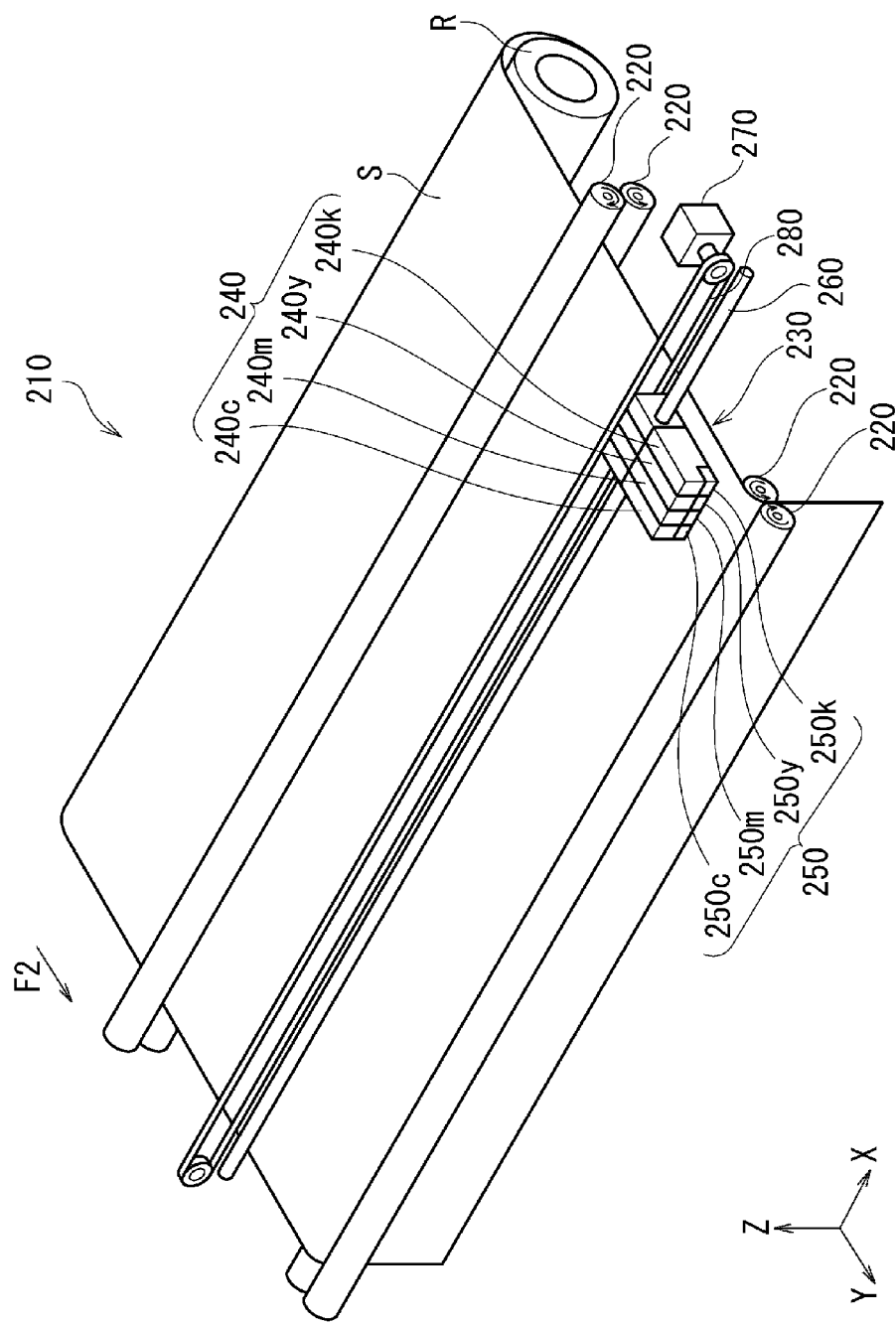
FIG. 3 is a schematic view illustrating a structure of an image forming portion 210 in the MFP 100.

FIG. 3 is a schematic view illustrating a structure of the image forming portion 210.

The image forming portion 210 with a function of a so-called printer is housed in the housing 120 and is configured, for example, as follows. The image forming portion 210 includes a roll sheet R, sheet conveyor rollers 220, and a printer head 230. The printer head 230 includes, for example, ink tanks 240 (240c, 240m, 240y, and 240k) with cyan C, magenta M, yellow Y, and black K inks and discharge heads 250 (250c, 250m, 250y, and 250k) arranged on the ink tanks 240, respectively. The image forming portion 210 also includes a printer head slide shaft 260, a printer head drive motor 270, and a belt 280 attached to the printer head 230. As shown in FIG. 2, the image forming portion 210 further includes a sheet discharge opening 290 from which a printed sheet S is discharged, and a sheet recovery unit 160.

In the image forming portion 210, the sheet S as one end of the continuous roll sheet R is placed between the sheet conveyor rollers 220 rotated and driven by the driving mechanism and is conveyed in a conveyance direction F2 to a printing position. The printer head drive motor 270 mechanically moves the belt 280, and the printer head 230 moves in the printing direction (X direction) along the printer head slide shaft 260 to print the image on the sheet S based on the electric signal. The operation is repeated until the printing is finished, and the printed sheet S is cut in the X direction. The cut sheet S is discharged from the sheet discharge opening 290 by the sheet conveyor rollers 220. The sheet recovery unit 160 disposed below the housing 120 recovers the sheet S discharged from the sheet discharge opening 290.

Although an inkjet-type image forming apparatus has been described as the image forming portion 210, the type can be any type, such as an electrophotographic type, a thermal transfer type, and a dot impact type.

First Embodiment

Constituent members of the image sensor unit 1 will be described with reference to FIGS. 4 and 5.

Figure 4:
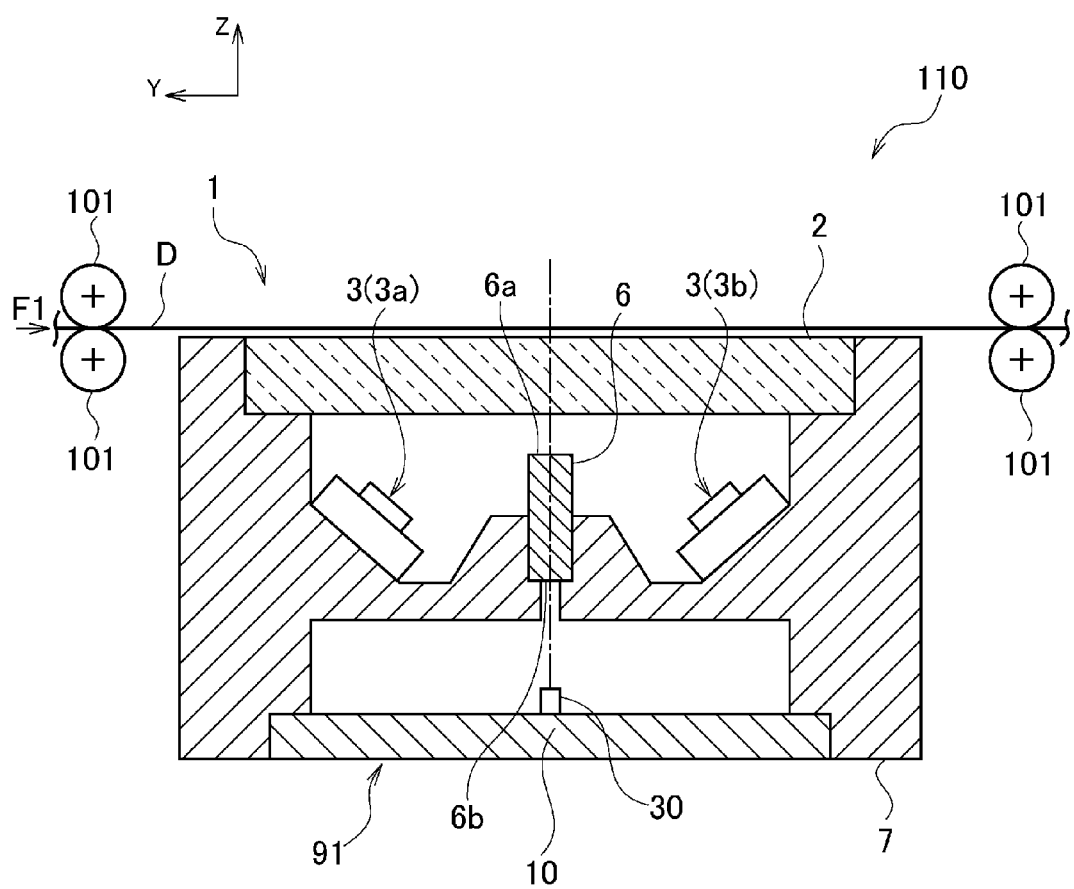
FIG. 4 is a sectional view illustrating a configuration of part of an image reading portion 110 in the MFP 100 including the image sensor unit 1 according to the present embodiments.

FIG. 4 is a sectional view illustrating a configuration of part of the image reading portion 110 including the image sensor unit 1. FIG. 5 is a schematic exploded perspective view of the image sensor unit 1.

The image sensor unit 1 includes a cover glass 2, light sources 3, rod-lens arrays 6 as light condensers, sensor substrate unit 91, a frame 7 as a supporting body that houses these components, and the like. The cover glass 2 and the frame 7 of the constituent members are formed long in the main-scan direction to handle the read length of the large original D.

The frame 7 houses the constituent members of the image sensor unit 1. The frame 7 is rectangular, and a plurality of projections and recesses are formed inside to position and support the constituent members of the image sensor unit 1. The frame 7 is formed by a light-blocking resin material that is colored in black, for example. Polycarbonate can be applied as the resin material, for example.

The cover glass 2 prevents dust from entering the frame 7. The cover glass 2 is planar and fixed on an upper part of the frame 7. Although the cover glass 2 is not essential in the present invention and can be omitted, it is desirable to set the cover glass 2 to protect the image sensor unit 1 from entrance of dust or scratches. The cover glass 2 is not limited to glass, and for example, a member formed by applying hard coating as necessary on the surface of a transparent resin material, such as an acrylic resin and polycarbonate, can be applied.

The light sources 3 (3a and 3b) illuminate the original D. The light sources 3a and 3b are fixed at positions below the cover glass 2 and symmetric about the rod-lens arrays 6. As shown in FIG. 5, each light source 3 includes, for example: light emitting elements 4r, 4g, and 4b with wavelengths of three colors of red R, green G, and blue B; and a substrate 5 for mounting the light emitting elements 4r, 4g, and 4b. The light emitting elements 4r, 4g, and 4b are, for example, LED chips and are mounted at predetermined intervals in a predetermined order on the substrate 5 formed long in the main-scan direction. The light sources 3a and 3b of the present embodiment include a plurality of substrates arranged in the main-scan direction, the substrates used in an image sensor unit that reads normal sized originals (for example, A4 and A3 sizes).

The rod-lens array 6 is an optical member for focusing the reflected light from the original D on the sensor chip 30 mounted on a substrate body 14 or 19 of the sensor substrate 10. The rod-lens array 6 is disposed at a center position of the light source 3a and the light source 3b. The sensor chip 30 is positioned on an extension of an optical axis (alternate long and short dash line illustrated in FIG. 4) formed between an incident surface 6a and an emission surface 6b of the rod-lens array 6. The rod-lens array 6 includes a plurality of imaging elements (rod-lenses) of an erect equal magnification imaging type arranged in the main-scan direction. The rod-lens arrays 6 of the present embodiment are formed by arranging a plurality of rod-lens arrays in the main-scan direction, the arrays used in an image sensor unit that reads normal sized originals.

Optical members with various well-known light condensing functions, such as various micro-lens arrays, can be applied as the light condensers.

The sensor substrate unit 91 includes a plurality of sensor substrates 10. The sensor substrate 10 includes the substrate bodies 14 and 19 and a plurality of sensor chips 30, the sensor chips 30 converting the reflected light focused by the rod-lens array 6 to electric signals. The plurality of sensor chips 30 are mounted on the substrate bodies 14 and 19 in the main-scan direction (longitudinal direction). The sensor substrate unit 91 is fixed under the frame 7. A plurality of sensor substrates 10 in a normal size are arranged and connected in the main-scan direction to form the sensor substrate unit 91 of the present embodiment at a predetermined read length. In this case, the sensor substrates 10 can be connected by a method described later to prevent damage of the sensor chips 30.

When the MFP 100 including the image sensor unit 1 configured as described above reads the original D, the image reading portion 110 successively activates the light emitting elements 4r, 4g, and 4b of the light sources 3a and 3b of the image sensor unit 1 to emit light on the original D conveyed by the original conveyor rollers 101 in a conveyance direction F1 at a predetermined conveyance speed. The light emitted from the light sources 3a and 3b is directed to the reading surface of the original D from two directions across the rod-lens array 6 to linearly and uniformly radiate the light throughout the main-scan direction. The original D reflects the radiated light to focus the light on photodiodes 31 described later of the sensor chips 30 through the rod-lens arrays 6. The sensor chips 30 convert the focused reflected light to electric signals, and a signal processing unit (not shown) processes the electric signals.

In this way, the image reading portion 110 reads the reflected light of R, G, and B of one scan line to complete the reading operation of one scan line in the main-scan direction of the original D. After the end of the reading operation of one scan line, a reading operation of the next one scan line is performed in the same way as the operation described above along with the movement of the original D in the sub-scan direction. In this way, the image reading portion 110 repeats the reading operation of one scan line, while conveying the original D in the conveyance direction F1, to read the image of the entire surface of the original D.

A configuration of the sensor substrate unit 91 will be described. The following description is about connection of two sensor substrates 10 in a line in the main-scan direction.

Figure 6A:
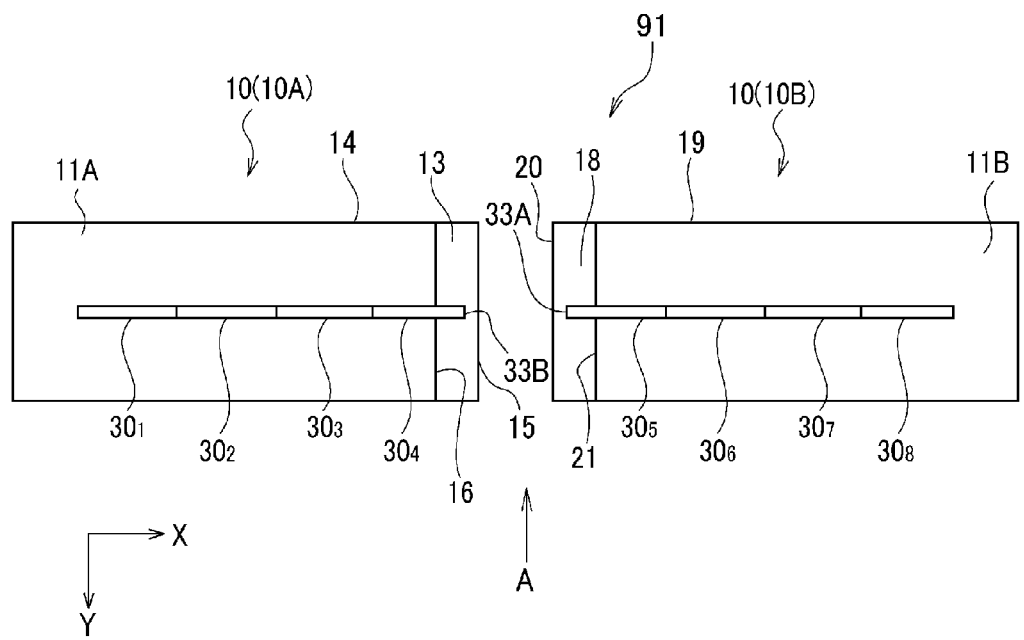
FIG. 6A is a plan view of a sensor substrate unit 91 according to a first embodiment.
Figure 6B:
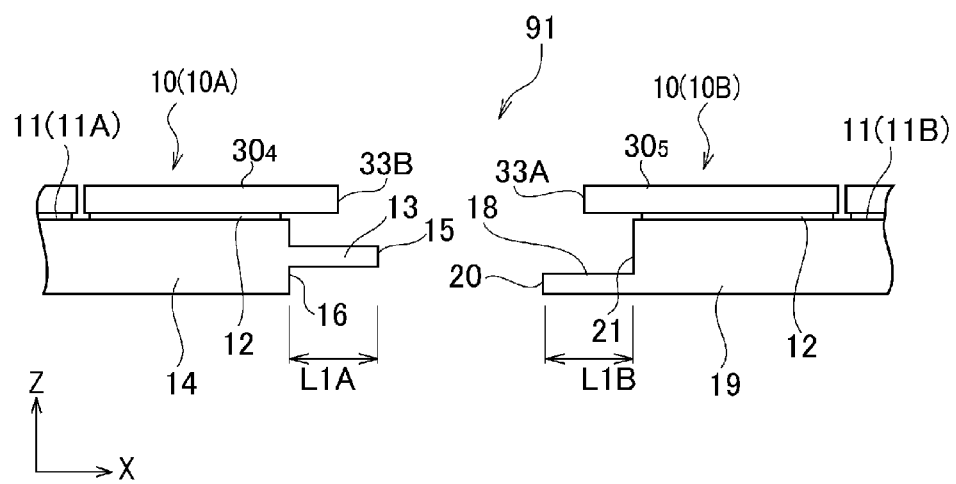
FIG. 6B is a view from an arrow A direction of FIG. 6A.

FIG. 6A is a plan view of the sensor substrate unit 91. FIG. 6B is a view from an arrow A direction of FIG. 6A.

As shown in FIG. 6A, the substrate body 14 of the sensor substrate 10A and the substrate body 19 of the sensor substrate 10B are formed in rectangular planar shapes long in the main-scan direction. For example, ceramic substrates or glass epoxy substrates can be used as the substrate bodies 14 and 19.

A plurality of (four each in FIG. 6A) sensor chips 30 ($30_1$ to $30_4$ and $30_5$ to $30_8$) are mounted on mounting surfaces 11A and 11B of the substrate bodies 14 and 19, the sensor chips 30 arranged in a line in the main-scan direction (longitudinal direction). As shown in FIG. 6B, the sensor chips 30 ($30_1$ to $30_8$) are fixed on the mounting surfaces 11A and 11B by, for example, a thermosetting adhesive 12.

Figure 7:
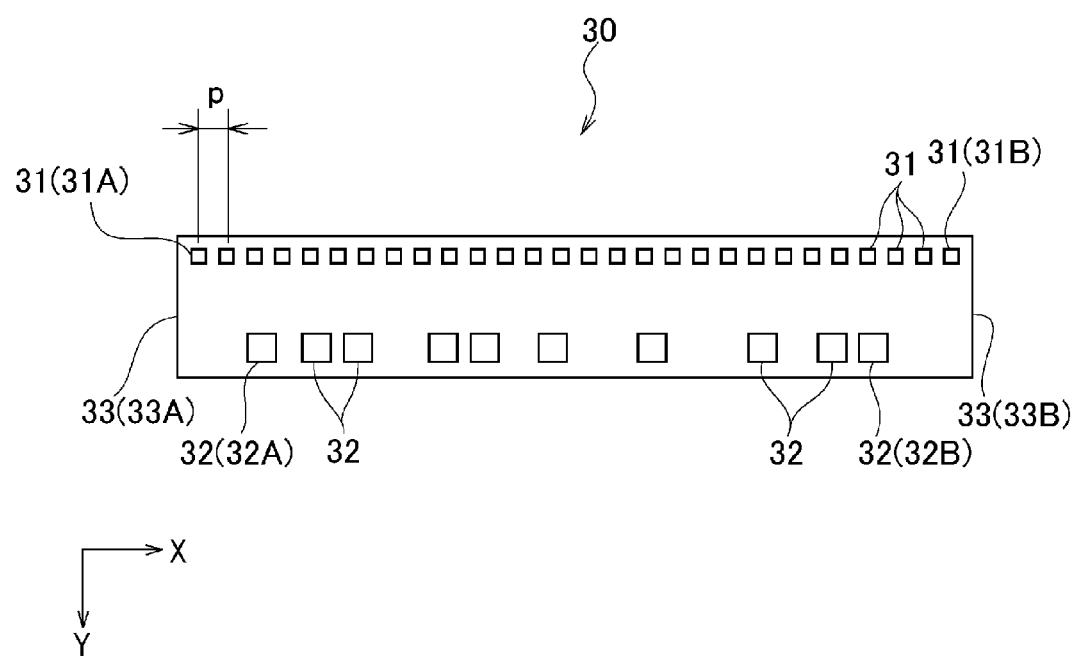
FIG. 7 is a plan view illustrating a configuration of a sensor chip 30.

FIG. 7 is a plan view illustrating a configuration of the sensor chip 30.

The sensor chip 30 includes a plurality of photodiodes 31 as light receiving elements, a plurality of pads 32, circuit patterns (not shown), and the like. The photodiodes 31 play a role to detect the reflected light and are arranged in a line in the main-scan direction at equal pitches p. The photodiodes 31 are arranged throughout the whole length in the main-scan direction of the sensor chip 30. That is, the photodiodes 31A and 31B positioned at left and right edges of the sensor chip 30 are brought into close contact with farthest tips 33 (33A and 33B) in the main-scan direction of the sensor chip 30.

Meanwhile, the pads 32 play various roles, beginning with input/output pads 32A and 32B that input and output a start signal for detecting the reflected light. The input/output pads 32A and 32B are connected to the input/output pads 32A and 32B of the adjacent sensor chip 30 by wire bonding through thin metallic wires. The connection may be through the circuit patterns (not shown) on the substrate bodies 14 and 19. The start signal of the first sensor chip 30 of each sensor substrate is input from the outside. The input/output pads 32A and 32B are disposed farther from the farthest tips 33A and 33B of the sensor chip 30 compared to the photodiodes 31A and 31B. The circuit patterns of an analog output circuit, a shift register, and the like (not shown) on the sensor chip 30 and desired circuit patterns (not shown) on the substrate bodies 14 and 19 are connected by thin metallic wires through the pads 32.

The disposition of the substrate bodies 14 and 19 and the sensor chips 30 will be further described with reference again to FIGS. 6A and 6B. In the following description of the present embodiment, a "right side" denotes the side closer to the sensor substrate 10B in the main-scan direction, and a "left side" denotes the side closer to the sensor substrate 10A in the main-scan direction.

The sensor substrate 10A will be described first. The substrate body 14 of the sensor substrate 10A is provided with an edge 13 on the right side that is the side connected to the sensor substrate 10B. The edge 13 is formed to protrude from the right side of the substrate body 14. As shown in FIG. 6B, the edge 13 is thinner than the thickness of the substrate body 14. Specifically, the edge 13 protrudes from a middle portion in the thickness direction (Z direction) of the substrate body 14 toward the sensor substrate 10B, parallel to the mounting surface 11A of the substrate body 14. A tip on the right side of the edge 13 is a farthest edge 15 positioned at the extreme right of the sensor substrate 10A.

An amount of protrusion of the edge 13, that is, a distance L1A (see FIG. 6B) from a base end 16 of the edge 13 to the farthest edge 15, is the same as an amount of protrusion of an edge 18 of the substrate body 19 described later.

A mounting position of the sensor chip 30 relative to the substrate body 14 will be described. The sensor chip $30_4$ that may affect the pixel missing and that may be damaged, that is, the sensor chip $30_4$ close to the side of the adjacent sensor substrate 10B, will be described.

In the sensor chip $30_4$ of the present embodiment, the farthest tip 33B on the right side is positioned inside (left side) of the farthest edge 15 of the sensor substrate 10A described above in the main-scan direction and is positioned and fixed outside (right side) beyond the base end 16 of the edge 13 in the main-scan direction. As shown in FIG. 6B, the right side (section including at least the farthest tip 33B) of the sensor chip $30_4$ does not touch the edge 13, and the sensor chip $30_4$ and the edge 13 are separated in the thickness direction of the substrate body 14. The width dimension (sub-scan direction) of the edge 13 is greater than the width dimension (sub-scan direction) of the sensor chip $30_4$. In the present embodiment, the width dimension of the edge 13 is the same as the width dimension of the substrate body 14.

As described, the farthest tip 33B of the sensor chip $30_4$ is positioned inside of the farthest edge 15 of the sensor substrate 10A in the main-scan direction (longitudinal direction). Therefore, even if an obstacle touches the sensor substrate 10A during handling or storage, the edge 13 touches the obstacle first rather than the sensor chip $30_4$. As a result, the sensor chip $30_4$ can be protected, and the damage can be prevented.

Particularly, the farthest tip 33B of the sensor chip $30_4$ overlaps with the edge 13 in the thickness direction of the substrate body 14, in plan view of the sensor chip $30_4$ as shown in FIG. 6A. Therefore, when the sensor substrate 10A and an obstacle come into contact during handling or storage, the edge 13—can be brought into touch with the obstacle first rather than the sensor chip $30_4$. As a result, the effect of preventing damage can be further improved.

Since the width dimension of the edge 13 is greater than the width dimension of the sensor chip $30_4$, the farthest tip 33B of the sensor chip $30_4$ is surrounded by the edge 13 in plan view. Therefore, the effect of preventing damage can be further improved.

The sensor substrate 10B will be described. The substrate body 19 of the sensor substrate 10B is provided with the edge 18 on the left side that is the side connected to the sensor substrate 10A. The edge 18 is formed to protrude from the left side of the substrate body 19. As shown in FIG. 6B, the edge 18 is thinner than the thickness of the substrate body 19. Specifically, the edge 18 protrudes from the bottom in the thickness direction (Z direction) of the substrate body 19 toward the sensor substrate 10A, parallel to the mounting surface 11B of the substrate body 19. In other words, the edge 18 protrudes at a position shifted from the aforementioned substrate body 19 in the thickness direction. A tip on the left side of the edge 18 is a farthest edge 20 positioned at the extreme left of the sensor substrate 10B.

An amount of protrusion of the edge 18, that is, a distance L1B (see FIG. 6B) from a base end 21 of the edge 18 to the farthest edge 20, is the same as the amount of protrusion L1A of the edge 13 of the adjacent substrate body 14.

A mounting position of the sensor chip 30 relative to the substrate body 19 will be described. The sensor chip $30_5$ that may affect the pixel missing and that may be damaged, that is, the sensor chip $30_5$ close to the side of the adjacent sensor substrate 10A, will be described.

In the sensor chip $30_5$ of the present embodiment, the farthest tip 33A on the left side is positioned inside (right side) of the farthest edge 20 of the sensor substrate 10B described above in the main-scan direction and is positioned and fixed outside (left side) beyond the base end 21 of the edge 18 in the main-scan direction. As shown in FIG. 6B, the left side (section including at least the farthest tip 33A) of the sensor chip $30_5$ does not touch the edge 18, and the sensor chip $30_5$ and the edge 18 are separated in the thickness direction of the substrate body 19. The width dimension (sub-scan direction) of the edge 18 is greater than the width dimension (sub-scan direction) of the sensor chip $30_5$. In the present embodiment, the width dimension of the edge 18 is the same as the width dimension of the substrate body 19.

As described, the farthest tip 33A of the sensor chip $30_5$ is positioned inside of the farthest edge 20 of the sensor substrate 10B in the main-scan direction (longitudinal direction). Therefore, even if an obstacle touches the sensor substrate 10B during handling or storage, the edge 18 touches the obstacle first rather than the sensor chip $30_5$. As a result, the sensor chip $30_5$ can be protected, and the damage can be prevented.

Particularly, the farthest tip 33A of the sensor chip $30_5$ overlaps with the edge 18 in the thickness direction of the substrate body 19, in plan view of the sensor chip $30_5$ as shown in FIG. 6B. Therefore, when the sensor substrate 10B and an obstacle come into contact during handling or storage, the edge 18—can be brought into touch with the obstacle first rather than the sensor chip $30_5$. As a result, the effect of preventing damage can be further improved.

Since the width dimension of the edge 18 is greater than the width dimension of the sensor chip $30_5$, the farthest tip 33A of the sensor chip $30_5$ is surrounded by the edge 18 in plan view. Therefore, the effect of preventing damage can be further improved.

A method of connecting the sensor substrates 10A and 10B will be described. There is a method in which an assembly worker uses a metallurgical microscope or a stereoscopic microscope to observe and connect the sensor substrates 10A and 10B. Hereinafter, a case in which the assembly worker uses a metallurgical microscope to observe and connect the sensor substrates 10A and 10B will be described.

The assembly worker manufactures in advance the sensor substrates 10A and 10B on which the sensor chips $30_1$ to $30_4$ and $30_5$ to $30_8$ are mounted.

The assembly worker uses a holder to hold the sensor substrates 10A and 10B so that the edge 13 of the sensor substrate 10A and the edge 18 of the sensor substrate 10B face each other as shown in FIGS. 6A and 6B. In this case, the assembly worker makes an adjustment so that the sensor chips $30_1$ to $30_4$ of the sensor substrate 10A and the sensor chips $30_5$ to $30_8$ of the sensor substrate 10B form a line.

The assembly worker moves the holder to gradually bring the sensor substrates 10A and 10B closer while maintaining the sensor chips $30_1$ to $30_4$ and the sensor chips $30_5$ to $30_8$ to form a line.

Figure 8A:
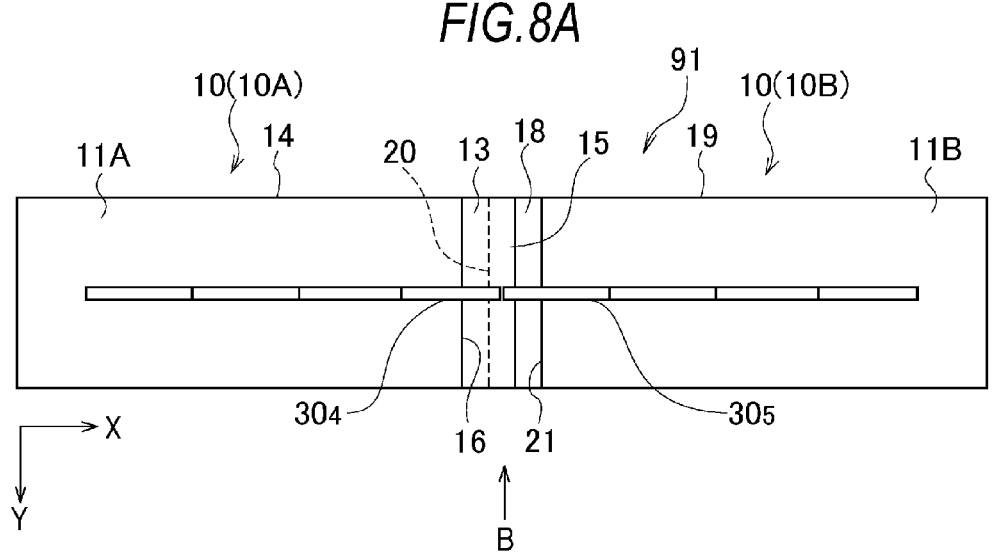
FIG. 8A is a plan view illustrating a state that adjacent sensor substrates 10 are brought into close contact according to the first embodiment.

FIGS. 8A and 1 are diagrams illustrating a state that the sensor substrates 10A and 10B are brought into close contact. FIG. 8A is a plan view of the sensor substrate unit 91. FIG. 1 is a view from an arrow B direction illustrated in FIG. 8A.

As shown in FIGS. 8A and 1, in the state that the sensor substrate 10A and the sensor substrate 10B are brought into close contact, the edge 13 of the sensor substrate 10A and the edge 18 of the sensor substrate 10B overlap in the thickness direction without touching. As shown in FIG. 1, the substrate bodies 14 and 19 do not touch each other below the area where the sensor chip $30_4$ and the sensor chip $30_5$ face each other, and a space 23 is formed.

Figure 8B:
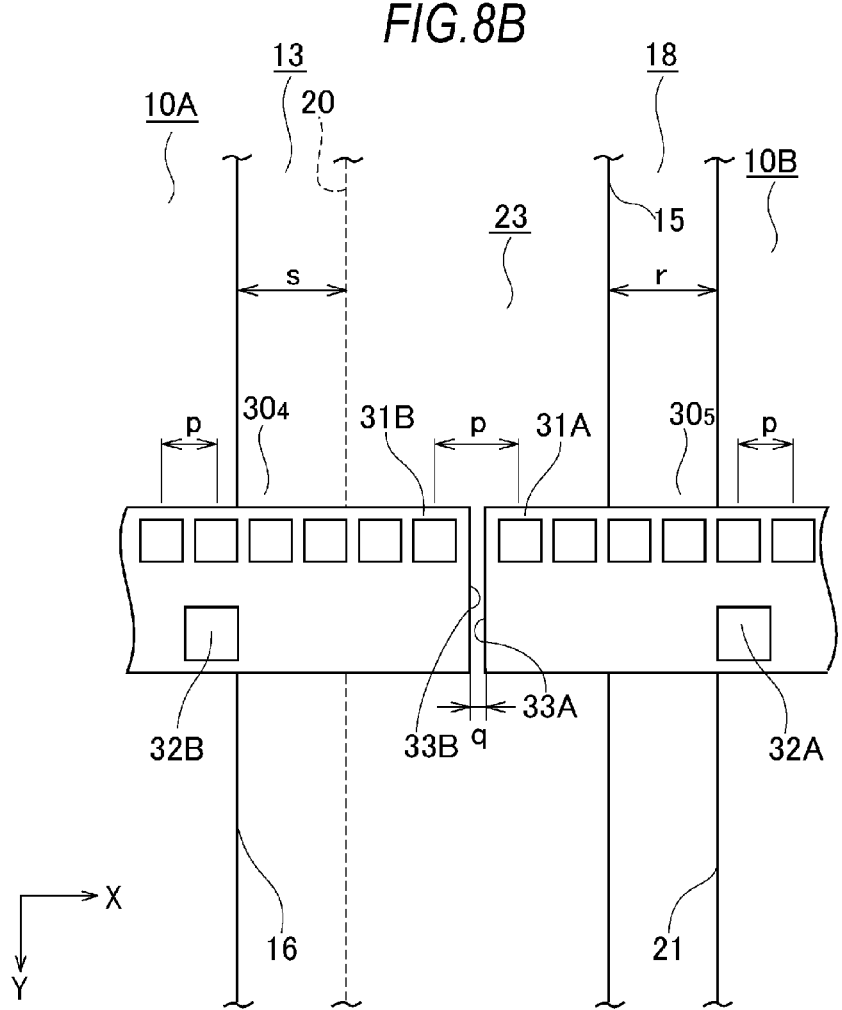
FIG. 8B is an enlarged view of a boundary section between the sensor substrate 10A and the sensor substrate 10B.

FIG. 8B is an enlarged view of a boundary section between the sensor substrate 10A and the sensor substrate 10B of FIG. 8A. As shown in FIG. 8B, the assembly worker adjusts the interval between the photodiode 31B of the sensor chip $30_4$ of the sensor substrate 10A and the photodiode 31A of the sensor chip $30_5$ of the sensor substrate 10B to be the same distance as the pitch p of the photodiodes 31.

As described, the farthest tip 33B of the sensor chip $30_4$ is positioned outside of the base end 16 of the edge 13, and the farthest tip 33A of the sensor chip $30_5$ is positioned outside of the base end 21 of the edge 18. The farthest tip 33B of the sensor chip $30_4$ and the edge 13 are separated in the thickness direction of the substrate body 14, and the farthest tip 33A of the sensor chip $30_5$ and the edge 18 are separated in the thickness direction of the substrate body 19. Therefore, other than the sensor chips 30, there is no obstacle that touches the sensor chips 30 at the nearest surrounding of the farthest tip 33B of the sensor chip $30_4$ and the nearest surrounding of the farthest tip 33A of the sensor chip $30_5$. As a result, the intervals of the sensor chips 30 can be accurately determined without being inhibited by obstacles.

The interval between the photodiode 31B of the sensor chip $30_4$ and the photodiode 31A of the sensor chip $30_5$ may not be the same distance as the pitch p and may be a distance greater than the pitch p if the distance is a predetermined distance. More specifically, as long as the interval between the photodiode 31B of the sensor chip $30_4$ and the photodiode 31A of the sensor chip $30_5$ is a predetermined distance, the image can be interpolated based on the predetermined distance after the image is read by the image sensor unit 1.

As shown in FIG. 8B, when the distance between the photodiode 31B of the sensor chip $30_4$ and the photodiode 31A of the sensor chip $30_5$ is the pitch p or the predetermined distance, there is a gap (distance q shown in FIG. 8B) between the farthest tip 33B of the sensor chip $30_4$ and the farthest tip 33A of the sensor chip $30_5$. The distance q of the gap is set to be smaller than a distance (distance r shown in FIG. 8B) between the farthest edge 15 and the base end 21 and smaller than a distance (distance s shown in FIG. 8B) between the farthest edge 20 and the base end 16. Therefore, the contact of the farthest edge 15 with the base end 21 can be prevented before the distance between the photodiode 31B of the sensor chip $30_4$ and the photodiode 31A of the sensor chip $30_5$ is adjusted to the pitch p or the predetermined distance. Likewise, the contact of the farthest edge 20 with the base end 16 before the distance between the photodiode 31B of the sensor chip $30_4$ and the photodiode 31A of the sensor chip $30_5$ is adjusted to the pitch p or the predetermined distance can be prevented.

Figure 9A:
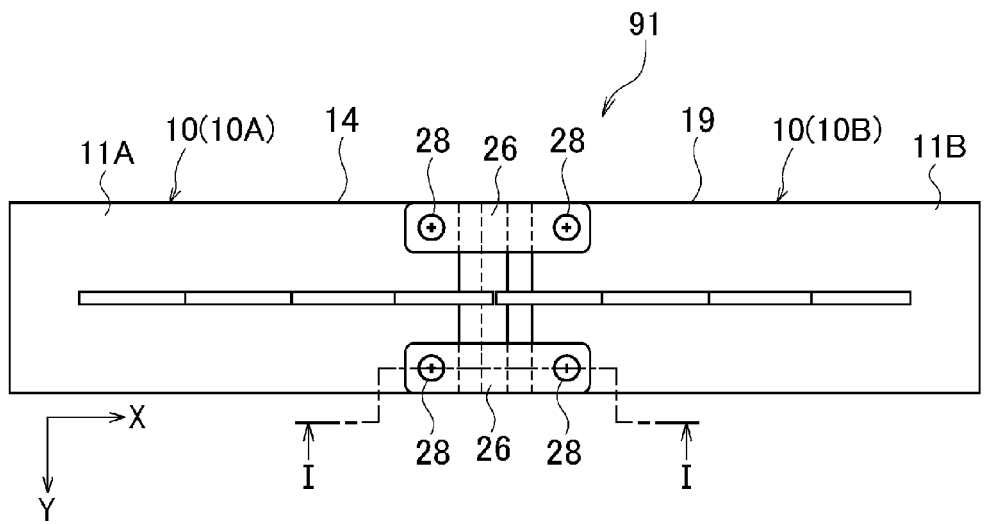
FIG. 9A is a plan view illustrating a state that the sensor substrates 10 are fixed by fixation members 26 according to the first embodiment.
Figure 9B:
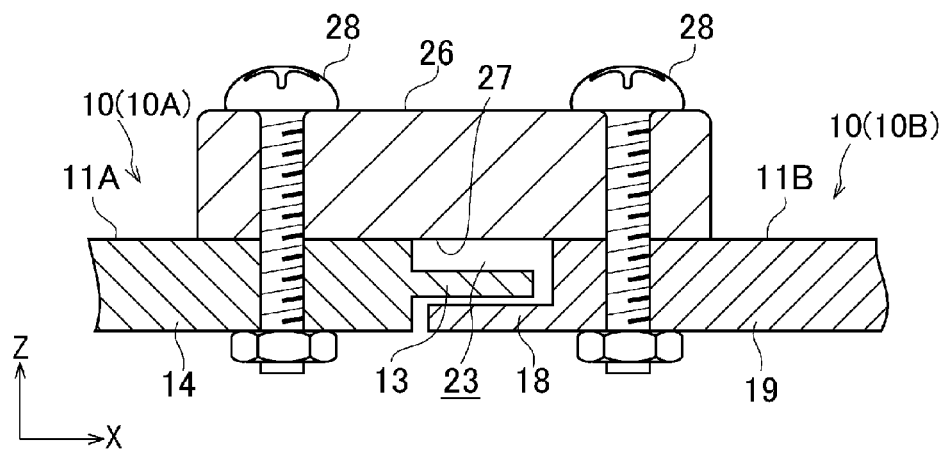
FIG. 9B is a sectional view of the state that the sensor substrates 10 are fixed by the fixation members 26 according to the first embodiment.

After the completion of the adjustment of the distance between the sensor substrates 10, the assembly worker fixes the fixation members 26 to the mounting surfaces 11A and 11B. FIG. 9A is a plan view illustrating a state that the sensor substrates 10A and 10B are fixed by the fixation members 26. FIG. 9B is a sectional view of a I-I line shown in FIG. 9A.

As shown in FIGS. 9A and 9B, the fixation members 26 of the present embodiment are formed in a rectangular planar shape and are fixed at two sections on both sides of the sensor substrates 10A and 10B in the sub-scan direction (width direction). Specifically, the fixation members 26 are fixed across the mounting surface 11A of the substrate body 14 and the mounting surface 11B of the substrate body 19. Screws 28 are used to fix the fixation members 26 on the mounting surfaces 11A and 11B. Therefore, the fixation members 26 connect the sensor substrates 10, while the distance between the sensor substrates 10 is held.

As shown in FIG. 9B, an abutment surface 27 of the fixation member 26 abutted with the mounting surface 11A of the substrate body 14 and the mounting surface 11B of the substrate body 19 is formed in a flat surface. Therefore, the mounting surface 11A of the substrate body 14 and the mounting surface 11B of the substrate body 19 can be held in a flush state, and the sensor chips $30_1$ to $30_8$ mounted on the mounting surfaces 11A and 11B can also be held in a flush state.

The fixation members 26 are at least formed by a material with a coefficient of linear expansion lower than that of the substrate bodies 14 and 19. Since the fixation members 26 are fixed to the mounting surface 11A of the substrate body 14 and the mounting surface 11B of the substrate body 19, expansion and contraction of the fixation members 26 may affect the distance between the photodiode 31B of the sensor chip $30_4$ and the photodiode 31A of the sensor chip $30_5$. Therefore, the fixation members 26 can be formed by a material with a coefficient of linear expansion lower than that of the material of the substrate bodies 14 and 19 to reduce the change in the distance between the photodiodes 31B and 31A. More specifically, even if the temperature of the storage location drops when the image sensor unit 1 is stored without being used, the contact of the sensor chips $30_4$ and $30_5$ can be prevented by reducing the contraction of the fixation members 26 in the main-scan direction.

As described above, a space 23 is formed below the section where the sensor chips $30_4$ and $30_5$ face each other. Therefore, even if the flush state cannot be maintained between the sensor chips $30_4$ and $30_5$ and there is a difference in level in the direction orthogonal to the mounting surface 11, the formation of the space 29 can prevent the sensor chip 30 in the lower level from touching the mounting surface 11 of the sensor substrate 10.

In the state shown in FIG. 8B, the assembly worker uses thin metallic wires to electrically connect, by wire bonding, the input/output pad 32B of the sensor chip $30_4$ of the sensor substrate 10A and the input/output pad 32A of the sensor chip $30_5$ of the sensor substrate 10B. In this case, there is no space 23 shown in FIG. 1 below the pads 32A and 32B, and there are the mounting surfaces 11A and 11B of the substrate bodies 14 and 19. More specifically, there is the adhesive 12 for fixing the sensor substrates 10A and 10B with the sensor chips $30_4$ and $30_5$. Therefore, even if the pads 32A and 32B are pressurized by wire bonding, the adhesive 12 and the substrate bodies 14 and 19 can support the force, and the load on the sensor chips $30_4$ and $30_5$ can be reduced. Therefore, when the sensor chips $30_4$ and $30_5$ are mounted on the substrate bodies 14 and 19, the input/output pads 32A and 32B are fixed at positions within a range (area T shown in FIG. 1) where the adhesive 12 is applied. The electric connection by wire bonding using the thin metallic wires may be performed just after the mounting of the sensor chips $30_1$ to $30_4$ and $30_5$ to $30_8$ on the substrate bodies 14 and 19 by the assembly worker.

Figure 5:
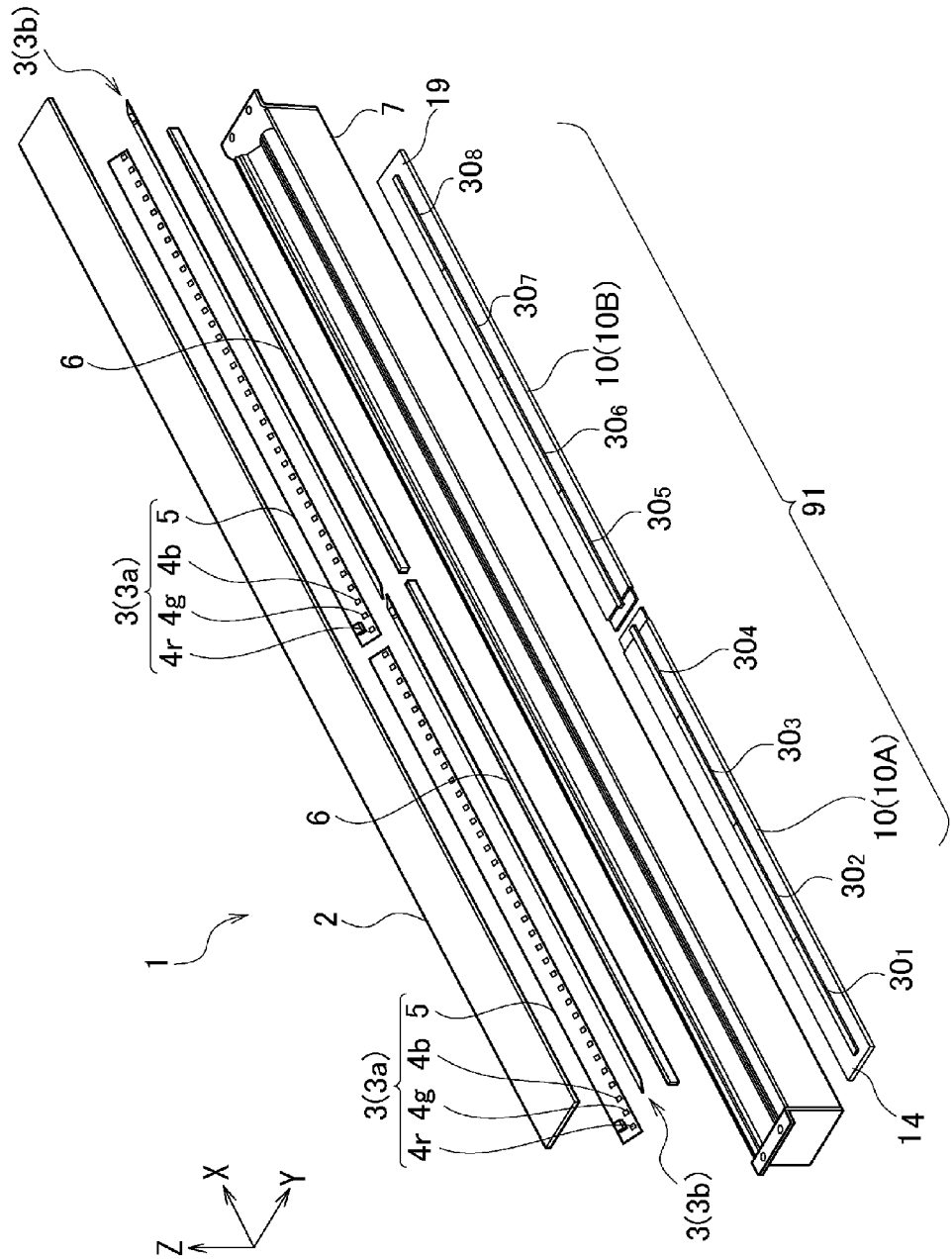
FIG. 5 is a schematic exploded perspective view of the image sensor unit 1 according to the present embodiments.

The assembly worker incorporates the sensor substrate unit 91 connected with sensor substrates 10A and 10B into the frame 7 shown in FIG. 5 to fix the sensor substrates 10A and 10B to the frame 7 by screws or adhesive to manufacture the image sensor unit 1. In this way, the pitch p or the predetermined distance is maintained between the sensor chips $30_4$ and $30_5$ in the manufactured image sensor unit 1 as described above, and the image can be read without missing pixels.

In this way, the farthest tips 33B and 33A of the sensor chips $30_4$ and $30_5$ mounted on the substrate bodies 14 and 19 of the sensor substrates 10A and 10B are positioned inside of the farthest edges 15 and 20 of the edges 13 and 18 of the substrate bodies 14 and 19 in a longitudinal direction in the present embodiment. Therefore, even if an obstacle touches the sensor substrates 10A and 10B during handling or storage, the obstacle touches the edges 13 and 18 rather than the sensor chips $30_4$ and $30_5$. As a result, the sensor chips $30_4$ and $30_5$ can be protected, and the damage can be prevented.

Second Embodiment

Figure 10:
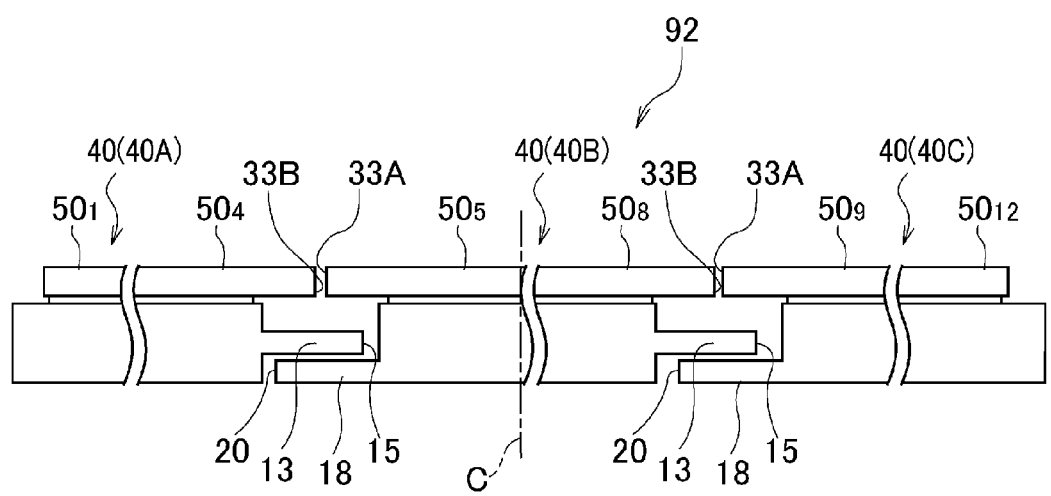
FIG. 10 is a plan view of a sensor substrate unit 92 according to a second embodiment.

The case of connecting the two sensor substrates 10A and 10B has been described in the first embodiment. A case of connecting three sensor substrates 40A, 40B, and 40C will be described in the present embodiment. FIG. 10 is a plan view illustrating configurations of the sensor substrate unit 92 according to the present embodiment. A plurality of (e.g. four each) sensor chips 50 ($50_1$ to $50_4$, $50_5$ to $50_8$, and $50_9$ to $50_{12}$) are mounted on the mounting surfaces of the respective substrate bodies of the sensor substrates 40A, 40B, and 40C, and the sensor chips 50 are linearly arranged in the main-scan direction (longitudinal direction). In FIG. 10, $50_2$, $50_3$, $50_6$, $50_7$, $50_{10}$, and $50_{11}$ will be omitted.

As shown in FIG. 10, the sensor substrate 40A of the three sensor substrates has similar components to those of the sensor substrate 10A of the first embodiment. The sensor substrate 40B has combined components of the sensor substrate 10A and the sensor substrate 10B of the first embodiment. The sensor substrate 40C has similar components to those of the sensor substrate 10B of the first embodiment. The similar components to those of the first embodiment are designated with the same reference numerals in FIG. 10.

The edge 13 is formed on the right side of the substrate body of the sensor substrate 40A, and the edge 18 is formed on the left side of the substrate body of the sensor substrate 40B. The edge 13 is formed on the right side of the substrate body of the sensor substrate 40B, and the edge 18 is formed on the left side of the substrate body of the sensor substrate 40C.

The farthest tips 33B of the sensor chips $50_4$ and $50_8$ mounted on the substrate bodies of the sensor substrates 40A and 40B are positioned inside of the farthest edges 15 of the edges 13 in the main-scan direction. The farthest tips 33A of the sensor chips $50_5$ and $50_9$ mounted on the substrate bodies of the sensor substrates 40B and 40C are positioned inside of the farthest edges 20 of the edges 18 in the main-scan direction.

Therefore, even if an obstacle touches the sensor substrates 40A, 40B, and 40C during handling or storage, the obstacle first touches the edges 13 and 18 rather than the sensor chips $50_4$, $50_5$, $50_8$, and $50_9$. As a result, the sensor chips $50_4$, $50_5$, $50_8$, and $50_9$ can be protected, and the damage can be prevented. The assembly method of the sensor substrates 40A, 40B, and 40C is similar to that of the first embodiment, and the description will not be repeated.

Although the present invention has been described with various embodiments, the present invention is not limited to the embodiments, and changes and the like can be made within the scope of the present invention.

For example, in the second embodiment, the edges 13 and 18 may be line-symmetric to a center line C shown in FIG. 10 in the three sensor substrates 40A, 40B, and 40C. Although the case of connecting the three sensor substrates 40A, 40B, and 40C has been described, the case is not limited to this. A case of connecting four or more sensor substrates can be similarly applied.

The image reading apparatus is not limited to the sheet-feed type image scanner, and a flat-bed type image scanner can also be similarly applied.

The case of arranging the individual sensor chips 30 (sensor chips 50) in a line in the main-scan direction (longitudinal direction), specifically, in a straight line, has been described in the present embodiments. However, the arrangement is not limited to this, and a case of arranging the individual sensor chips in a staggered manner can also be similarly applied.

FIG. 11 is a plan view of sensor substrate unit 93 according to another embodiment. A plurality of (four each in FIG. 11) sensor chips 70 ($70_1$ to $70_4$, $70_5$ to $70_8$, and $70_9$ to $70_{12}$) are mounted on mounting surfaces of substrate bodies of sensor substrates 60A, 60B, and 60C. In FIG. 11, the individual sensor chips $70_1$ to $70_4$ mounted on the substrate body of the sensor substrate 60A are alternately shifted in the width direction to form a staggered arrangement. The individual sensor chips $70_5$ to $70_8$ and $70_9$ to $70_{12}$ of the substrate bodies of the sensor substrates 60B and 60C are similarly arranged in the staggered manner. In this way, the arrangement in a line is not limited to the arrangement in a straight line, and the arrangement in a staggered manner that can be approximated to the arrangement in a line is also included.

In the description of the present embodiments, when the adjacent sensor substrates 10 (sensor substrates 40) are connected to each other, the sensor chips $30_1$ to $30_4$ and $30_5$ to $30_8$ (sensor chips $50_1$ to $50_4$, $50_5$ to $50_8$, and $50_9$ to $50_{12}$) form a line, specifically, a straight line. However, the arrangement is not limited to this, and a case of connecting the sensor substrates so that the sensor chips are arranged in a staggered manner when a plurality of sensor chips on the substrate body are seen as one sensor chip can also be similarly applied.

FIG. 12 is a plan view of sensor substrate unit 94 of another embodiment. A plurality of (four each in FIG. 12) sensor chips 90 ($90_1$ to $90_4$, $90_5$ to $90_8$, $90_9$ to $90_{12}$) are mounted on mounting surfaces of substrate bodies of sensor substrates 80A, 80B, and 80C, the sensor chips 90 arranged in a straight line. In FIG. 12, the sensor chips $90_1$ to $90_4$ mounted on the substrate body of the sensor substrate 80A and the sensor chips $90_5$ to $90_8$ mounted on the sensor substrate 80B are shifted in the sub-scan direction. The sensor chips $90_5$ to $90_8$ mounted on the substrate body of the sensor substrate 80B and the sensor chips $90_9$ to $90_{12}$ mounted on the substrate body of the sensor substrate 80C are shifted in the sub-scan direction. Therefore, the sensor substrates 80A, 80B, and 80C are connected so that the sensor chips are arranged in a staggered manner when the sensor chips $90_1$ to $90_4$, $90_5$ to $90_8$, and $90_9$ to $90_{12}$ are seen as one sensor chip each.

The image sensor unit, the image reading apparatus, and the image forming apparatus according to the present invention are to prevent damage to sensor chips.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An image sensor unit comprising:
   a light source configured to illuminate an object to be read;
   a sensor substrate unit connecting a plurality of sensor substrates comprising a plurality of sensor chips arranged and mounted in a line in a longitudinal direction;
   a light condenser that focuses light from the object to be read on the sensor substrate unit; and
   a supporting body that supports the light source, the sensor substrate unit, and the light condenser, wherein
   edges of the connected sensor substrates are brought into close contact with each other in the sensor substrate unit,
   farthest tips of the sensor chips at the edges are positioned inside of farthest edges of the edges in the longitudinal direction of the sensor substrates,
   the edges of the connected sensor substrates overlap each other in a thickness direction of the sensor substrates in plan view, and
   the edges are formed to protrude from substrate bodies of the sensor substrates, parallel to mounting surfaces of the sensor substrates, and the edges are thinner than a thickness of the substrate bodies.

2. The image sensor unit according to claim 1, wherein the sensor chips and the edges are separated in the thickness direction of the sensor substrates.

3. The image sensor unit according to claim 1, further comprising
   fixation members fixed to the mounting surfaces across the mounting surfaces between the substrate bodies of the connected sensor substrates.

4. The image sensor unit according to claim 3, wherein the fixation members are fixed to the mounting surfaces with gaps formed between the substrate bodies of the connected sensor substrates in the longitudinal direction.

5. The image sensor unit according to claim 3, wherein a coefficient of linear expansion of the fixation members is lower than a coefficient of linear expansion of the substrate bodies.

6. The image sensor unit according to claim 1, wherein
the sensor chip comprises a pad connected to another circuit pattern by wire bonding using a thin metallic wire, and
the pad is positioned inside of the base end of the edges of the sensor substrate in the longitudinal direction.

7. An image reading apparatus comprising:
an image sensor unit; and
image reading means configured to read light from an object to be read while relatively moving the image sensor unit and the object to be read, wherein
the image sensor unit comprises:
a light source configured to illuminate the object to be read;
a sensor substrate unit connecting a plurality of sensor substrates comprising a plurality of sensor chips arranged and mounted in a line in a longitudinal direction;
a light condenser that focuses light from the object to be read on the sensor substrate unit; and
a supporting body that supports the light source, the sensor substrate unit, and the light condenser, wherein
edges of the connected sensor substrates are brought into close contact with each other in the sensor substrate unit,
farthest tips of the sensor chips at the edges are positioned inside of farthest edges of the edges in the longitudinal direction of the sensor substrates,
the edges of the connected sensor substrates overlap each other in a thickness direction of the sensor substrates in plan view, and
the edges are formed to protrude from substrate bodies of the sensor substrates, parallel to mounting surfaces of the sensor substrates, and the edges are thinner than a thickness of the substrate bodies.

8. An image forming apparatus comprising:
an image sensor unit;
image reading means configured to read light from an object to be read while relatively moving the image sensor unit and the object to be read; and
image forming means configured to form an image on a recording medium, wherein the image sensor unit comprises:
a light source configured to illuminate the object to be read;
a sensor substrate unit connecting a plurality of sensor substrates comprising a plurality of sensor chips arranged and mounted in a line in a longitudinal direction;
a light condenser that focuses light from the object to be read on the sensor substrate unit; and
a supporting body that supports the light source, the sensor substrate unit, and the light condenser, wherein
edges of the connected sensor substrates are brought into close contact with each other in the sensor substrate unit,
farthest tips of the sensor chips at the edges are positioned inside of farthest edges of
the edges in the longitudinal direction of the sensor substrates, the edges of the connected sensor substrates overlap each other in a thickness direction of the sensor substrates in plan view, and
the edges are formed to protrude from substrate bodies of the sensor substrates, parallel to mounting surfaces of the sensor substrates, and the edges are thinner than a thickness of the substrate bodies.

9. The image sensor unit according to claim 1, wherein
widths of sensor substrates exceed widths of the sensor chips in a sub-scan direction of the sensor substrates, and the thickness direction of the sensor substrates is substantially perpendicular to the sub-scan direction of the sensor substrates and the longitudinal direction of the sensor substrates.

10. The image sensor unit according to claim 1, wherein
the edges of the connected sensor substrates overlap each other in the thickness direction of the sensor substrates in cross-sectional view.

* * * * *